_United States Patent Office_

2,853,535
Patented Sept. 23, 1958

2,853,535

CATALYTIC PROCESS FOR PREPARING A CONJUGATE DIENE CONTAINING 5 TO 8 CARBON ATOMS BY DEHYDRATING A TERTIARY ALCOHOL

Bernard S. Friedman and Seymour H. Patinkin, Chicago, and Willis C. Keith, Lansing, Ill., assignors to Sinclair Refining Company, New York, N. Y., a corporation of Maine No Drawing. Application April 9, 1956
Serial No. 576,799

6 Claims. (Cl. 260—681)

Our invention relates to a method for the preparation of isoprene and related conjugated diene hydrocarbons. The hydrocarbons produced by practicing our invention are useful in the manufacture of synthetic rubber and for other purposes.

It has heretofore been proposed to prepare isoprene by any of a variety of methods, such as the catalytic dehydrogenation of isopentane and isoamylenes. Thus, Komarewsky and Stringer, J. A. C. S. 63, 921-2 (1941), conducted the dehydration and dehydrogenation of isoamyl alcohol over a chromia-alumina catalyst to produce isoprene. The yields were low and a considerable amount of side reactions resulted.

In accordance with our present invention, we have discovered that isoprene and related conjugated diene hydrocarbons can be advantageously prepared by passing a saturated tertiary monohydric alcohol containing from 5 to 8 carbon atoms, such as tertiary amyl alcohol, at approximately atmospheric pressure in vapor phase at elevated temperatures and in admixture with steam into contact with a catalyst which has dehydrogenating activity and which is at the same time steam insensitive, for example, nickel calcium phosphate. The conjugated diene hydrocarbon, such as isoprene, can be separated from the reactor effluent using conventional means, such as simple distillation and extractive distillation, and unconverted alcohol and monoolefin hydrocarbons present in the reactor effluent can also be similarly recovered and recycled.

Operation in this manner has significant advantages. For example, by methods known in the art, $C_5$ monoolefin hydrocarbons can be separated from streams conventionally produced in petroleum refinery operations, hydrated to produce monohydric alcohols, and tertiary alcohols separated therefrom in highly pure form, thereby aiding in the purity of the isoprene or other conjugated diolefin hydrocarbon produced. Moreover, the dehydration-dehydrogenation reaction of our invention is highly selective with respect to conversion to isoprene or other conjugated diolefin hydrocarbon, with little or no dehydrogenation to form ketones or other decomposition products.

The following examples illustrate embodiments which fall within the scope of our invention.

*Example I*

Tertiary amyl alcohol (B. P. 100–101° C.) in admixture with steam was passed through a reactor charged with 70 grams (65 ml.) of Dow "B" catalyst (a commercially available calcium-nickel phosphate catalyst of the approximate formula $Ca_8Ni(PO_4)_6$ stabilized with chromium oxide). Before being introduced into the catalyst bed, the mixture of tertiary amyl alcohol and steam was preheated to a temperature of 1100° F. The catalyst bed was six inches long and was maintained at a temperature of 1100° F.±10° F. The space velocity was 0.8 (weight units of tertiary amyl alcohol per weight unit of catalyst per hour) and 23.4 moles of steam per mole of tertiary amyl alcohol were employed in admixture with the tertiary amyl alcohol. This procedure was conducted for a period of 30 minutes and, based upon the weight of the tertiary amyl alcohol feed, yielded 16.05 weight percent of isoprene and 76.85 weight percent of isoamylenes. The isoamylenes can be separated from the effluent from the catalyst bed and recycled in admixture with fresh tertiary amyl alcohol to produce further quantities of the desired isoprene.

*Example II*

This example was conducted in the same manner as Example I, with the exception that the weight hourly space velocity employed was 1.6 and the molar ratio of steam to tertiary amyl alcohol introduced into the reaction zone was 20.4. This procedure was conducted for a period of 30 minutes and, based upon the weight of the tertiary amyl alcohol feed, yielded 12.0 weight percent of isoprene and 82.7 weight percent of isoamylenes. The isoamylenes can be separated from the effluent from the catalyst bed and recycled in admixture with fresh tertiary amyl alcohol to produce further quantities of the desired isoprene.

Further modifications can be made in the procedures of the specific examples to provide other embodiments which fall within the scope of our invention. Thus, in place of the tertiary amyl alcohol utilized there can be substituted an equimolar amount of other saturated aliphatic tertiary monohydric alcohols containing from 5 to 8 carbon atoms, such as 2-methyl-2-pentanol, methyldiethylcarbinol, dimethylisopropylcarbinol and the like.

Generally, the reaction temperature employed will be within the range from about 1000° F. to about 1250° F. and the weight hourly space velocity will be within the range from about 0.1 to 2.5. As has been stated, monoolefin hydrocarbons can be separated from the reactor effluent and recycled in admixture with fresh tertiary monohydric alcohol. When this is done, the weight hourly space velocity employed will also generally be within the range from about 0.1 to about 2.5, but in this case the weight hourly space velocity is expressed in terms of weight units of alcohol plus the weight units of monoolefin per weight unit of catalyst per hour. The relative amounts of steam to tertiary alcohol plus recycled monoolefin hydrocarbon, if any, is recycled to the reaction zone, can also be varied widely, but will generally be within the molar range from about 5:1 to about 40:1.

Any of a wide variety of catalysts are useful in carrying out our process. The specific examples illustrate the use of a catalyst which is calcium nickel phosphate stabilized with chromium oxide. Such catalysts can be prepared by precipitating a solution of nickel and calcium chlorides with an ammonia-phosphoric acid solution. The flocculent precipitate is washed, filtered, dried, ground, mixed with 2 percent by weight of graphite and 2 percent by weight of chromium oxide, and pelleted. Catalysts of this type can be prepared as described in United States Patent No. 2,542,813 to Heath. They can be regenerated with a mixture of steam and air in accordance with procedures which are well known in the art. When calcium nickel phosphate catalysts are used in our process, a reaction temperature of from about 1050° F. to 1150° F., a weight hourly space velocity of from about 0.5 to about 2.0 and a molar steam to substrate (alcohol plus monoolefin, if any) ratio of from about 15:1 to 25:1 are utilized.

A wide variety of other catalysts are useful in our process, particularly those of the Standard Oil Development Company 1707 type which are essentially iron oxide or equivalent active material, such as copper oxide, chromium oxide, manganese oxide, cobalt oxide or nickel oxide, supported or not supported. No. 1707 is composed of 72.4 weight percent MgO, 18.4 weight percent $Fe_2O_3$, 4.6 weight percent CuO and 4.6 percent by weight $K_2O$, and can be prepared by adding a solution of iron and copper sulfate to magnesium oxide suspended in water, filtering the reacted mixture, wash incorporating with a solution of potassium carbonate, drying and calcining at 1200° F. Where iron oxide not supported is employed as a catalyst, the catalyst will consist predominantly (from 50 to 99.5 percent by weight) of iron oxide promoted with a minor amount (generally from 0.5 to 20 percent by weight) of an alkali metal oxide such as potassium oxide, sodium oxide, rubidium oxide or cerium oxide. Aluminum oxide, copper oxide and zinc oxide, generally in the amount of from 2 to 20 percent by weight, can be included in such catalysts as a stabilizer. Suitable catalysts of this type are composed of the following amounts of the following materials by weight:

(1) $98Fe_2O_3$ and $2K_2O$
(2) $93Fe_2O_3$ and $5CuO$ and $2K_2O$
(3) $91Fe_2O_3$ and $2Al_2O_3$ and $5CuO$ and $2K_2O$
(4) $96Fe_2O_3$ and $2Al_2O_3$ and $2K_2O$
(5) $78.5Fe_2O_3$ and $20Al_2O_3$ and $5CuO$ and $1.5K_2O$ Where the active catalytic material is supported, the support can be magnesia, zinc oxide, beryllium oxide or zirconium oxide. Among the iron oxide type-supported catalysts which can be employed in accordance with our invention are those composed of the following amounts of the following materials by weight:

(1) $80MgO$; $20Fe_2O_3$; $5CuO$
(2) $80MgO$; $20Fe_2O_3$; $5CuO$; $1.5K_2O$
(3) $80MgO$; $20Fe_2O_3$; $5CuO$; $1.5Na_2O$
(4) $80MgO$; $20Cr_2O_3$; $5CuO$; $1.5K_2O$
(5) $80MgO$; $20MnO_2$; $5CuO$; $1.5K_2O$
(6) $85MgO$; $10CuO$; $5K_2O$
(7) $90MgO$; $10Co_2O_3$; $5CuO$; $1.5K_2O$
(8) $80ZnO$; $20Fe_2O_3$; $5CuO$; $5K_2O$
(9) $80ZrO_2$; $20Fe_2O_3$; $5CuO$; $5K_2O$
(10) $80BeO$; $20Fe_2O_3$; $5CuO$; $5K_2O$
(11) $93Fe_2O_3$; $5CuO$; $2K_2O$

When catalysts of the 1707 type are employed, the reaction conditions preferably utilized are the same as those which are preferably utilized with the nickel calcium phosphate type catalyst, the molar steam to substrate ratio preferably being within the range from about 7 to about 15. In regenerating the 1707 type catalysts, this operation can be accomplished using steam in accordance with prior art procedures.

Various other catalysts which have dehydrogenating activity and which are steam insensitive can be employed in our process. Thus, we can use catalysts prepared by impregnating bauxite with about 5 percent by weight of barium hydroxide and/or strontium hydroxide, potassium hydroxide being employed as a promoter, if desired. In addition, we can use catalysts of the type of Shell 105 which is composed of approximately 90% by weight $Fe_2O_3$; 5 percent by weight $Cr_2O_3$ and 5 percent by weight KOH or $K_2CO_3$. Catalysts of this type can be made by simply mixing finely powdered calcined ferric oxide, chromic oxide and potassium carbonate, wetting, forming into pellets and calcining at 800° C. to 950° C.

We claim:
1. A method for the preparation of a conjugated diene hydrocarbon containing from 5 to 8 carbon atoms which comprises passing a mixture of steam and a saturated tertiary aliphatic monohydric alcohol having from 5 to 8 carbon atoms into contact with a catalyst which has dehydrogenating activity and which is steam insensitive at a temperature within the range from about 1000° F. to 1250° F. at approximately atmospheric pressure.

2. The method of claim 1 wherein said alcohol is tertiary amyl alcohol.

3. The method of claim 1 wherein said catalyst is calcium nickel phosphate.

4. The method of claim 1 wherein said alcohol is tertiary amyl alcohol and wherein said catalyst is calcium nickel phosphate.

5. The method of claim 1 wherein said catalyst is iron oxide.

6. The method of claim 1 wherein said catalyst is iron oxide supported on magnesia.

References Cited in the file of this patent

UNITED STATES PATENTS 2,461,147    Davies et al. _____ Feb. 8, 1949

OTHER REFERENCES

Komarewsky et al.: "Catalytic Dehydration and Dehydrogenation of Butyl and Amyl Alcohols," J. A. C. S., 63, 921-2 (1941).